Feb. 22, 1949.　　　　M. H. FRISBIE　　　　2,462,089
CABINET CULINARY APPLIANCE
Filed Jan. 24, 1944　　　　　　　　　　　　　　6 Sheets-Sheet 1

INVENTOR
Marshall H. Frisbie
BY
ATTORNEY

Feb. 22, 1949.  M. H. FRISBIE  2,462,089
CABINET CULINARY APPLIANCE
Filed Jan. 24, 1944  6 Sheets-Sheet 4

INVENTOR
Marshall H. Frisbie,
BY
ATTORNEY

Feb. 22, 1949.  M. H. FRISBIE  2,462,089
CABINET CULINARY APPLIANCE

Filed Jan. 24, 1944  6 Sheets—Sheet 5

INVENTOR
Marshall H. Frisbie,
BY
ATTORNEY

Feb. 22, 1949. M. H. FRISBIE 2,462,089
CABINET CULINARY APPLIANCE
Filed Jan. 24, 1944 6 Sheets-Sheet 6

INVENTOR
Marshall H. Frisbie,
BY
ATTORNEY

Patented Feb. 22, 1949

2,462,089

UNITED STATES PATENT OFFICE 2,462,089

CABINET CULINARY APPLIANCE

Marshall H. Frisbie, Hamden, Conn., assignor to The A. C. Gilbert Company, New Haven, Conn., a corporation of Maryland Application January 24, 1944, Serial No. 519,513

16 Claims. (Cl. 259—1)

This invention relates to portable household food mixers of the hinged overarm type in which an overarm that operatively holds the food mixing or agitating tool is swingable between a horizontal position in which its carried mixing tool reaches downward to a low point within a container for mixable food material and a more elevated position wherein the food mixing tool is raised clear of the top edge of the container so the latter may be removed from the mixer without being tipped.

In this type of household culinary appliance it has been conventional to locate a power plant or electric motor for driving the mixing tool directly within the above mentioned overarm and to hinge such motor carrying overarm to the top of a rather tall portable standard which serves as base. This practice tends to make the complete mixer top heavy or unstable and at best requires the standard to be equipped with a heavy base of wide-spread foot area in order to make the mixer as a whole stable against overturning when standing on a table. From such basic structural characteristics the conventional household mixer is found to be undesirably heavy to carry about from one place to another and it is space consuming and rather cumbersome to work with when in use and is particularly awkward to store in or about the kitchen when not in use.

One object of this invention is to reduce the weight, the size, and incidentally the manufacturing cost of a household food mixer by means of such reorganization of the positional and operative relationship of essential parts or subsections of the mixer as shall be productive of this result.

Another object is to associate structurally with the working parts of a household food mixer a cabinet or casing adequate to protect them from dust when not in use thereby to improve the sanitary aspects of such an appliance.

Another object is to arrange the working parts of the mixer within such a case or cabinet in such manner that a swingable overarm for operatively holding the mixing tool may collapse into very compact relationship to a power plant standing stationary in outboard relation to the overarm so that the cabinet may be of minimum overall size.

Another object is to facilitate the closing up for storage and the re-opening for use of a cabineted food mixer by providing compartment openings or doorways in the cabinet which give access to the interior thereof and through which the overarm may project out from the cabinet, which doorways to advantage may be closed by doors that comprise movable sections of the cabinet walls.

Another object is to make use of one such door, when it is open, to increase the base area of the cabinet upon which the mixer rests when in use thereby to increase the stability of the appliance as a whole, and further to make use of such door as a platform on which a removable container of the mixable food material may stand in proper location to receive the mixing tool.

Another object is to make accessible through one wall of the mixer cabinet a mechanical power take-off outlet presenting a powered work impelling chuck and adapted to receive and support auxiliary food working appliances which may thus automatically be supported and operated for grinding meat, seeding raisins, extracting fruit juices, etc.

A further object of these improvements is to incorporate preferably within a hollow base portion of the appliance cabinet sufficient suitably proportioned space to admit tucking thereinto a practical length of electrical attachment cord including the usual terminal plug.

Still further objects are to provide electrical control means for the power motor operative to stop and start the motor as a consequence merely of shifting the overarm upward away from working position, and to provide mechanical detent means automatically acting to arrest the overarm yieldably in any one of at least three different angular positions to which it may be swung with respect to the stationary power plant by which it is supported.

The foregoing and other features of the improvements will become apparent from the following description of preferred forms of the invention in which description reference is had to the accompanying drawings wherein.

Figure 6:
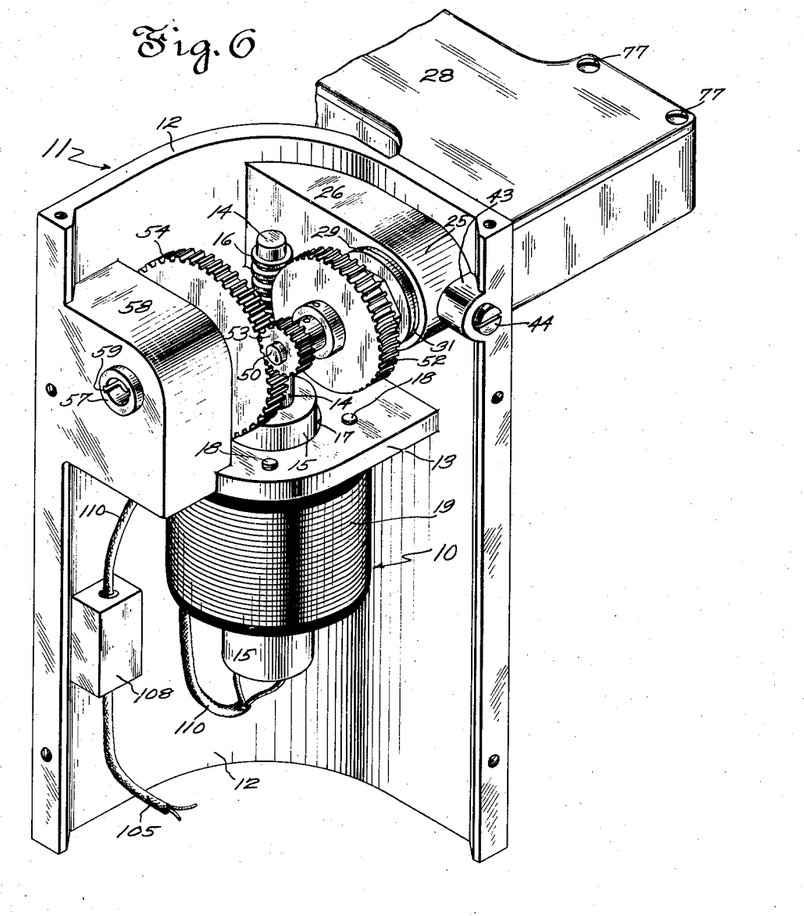
Fig. 6 is an isometric open rear view of the power plant and a portion of the overarm with the cabinet removed.

For attaining the objectives of this invention a power motor 10 is supported in rigid relation to a hollow cast power plant frame 11 in the nature of a standard and which may comprise an upright curved wall 12 braced on its interior or concave side by a horizontal web 13 cast integral with wall 12. Motor 10 is fastened fixedly to the bottom of web 13 by bolts 18 passing through motor stator threading into the web 19. The vertical motor shaft 14 projects upward from its bearings 15 through web 13 and fixedly carries the worm 16. Fig. 6 shows that one of the motor shaft bearings 15 may protrude through a central aperture 17 in the supporting web.

Figure 5:
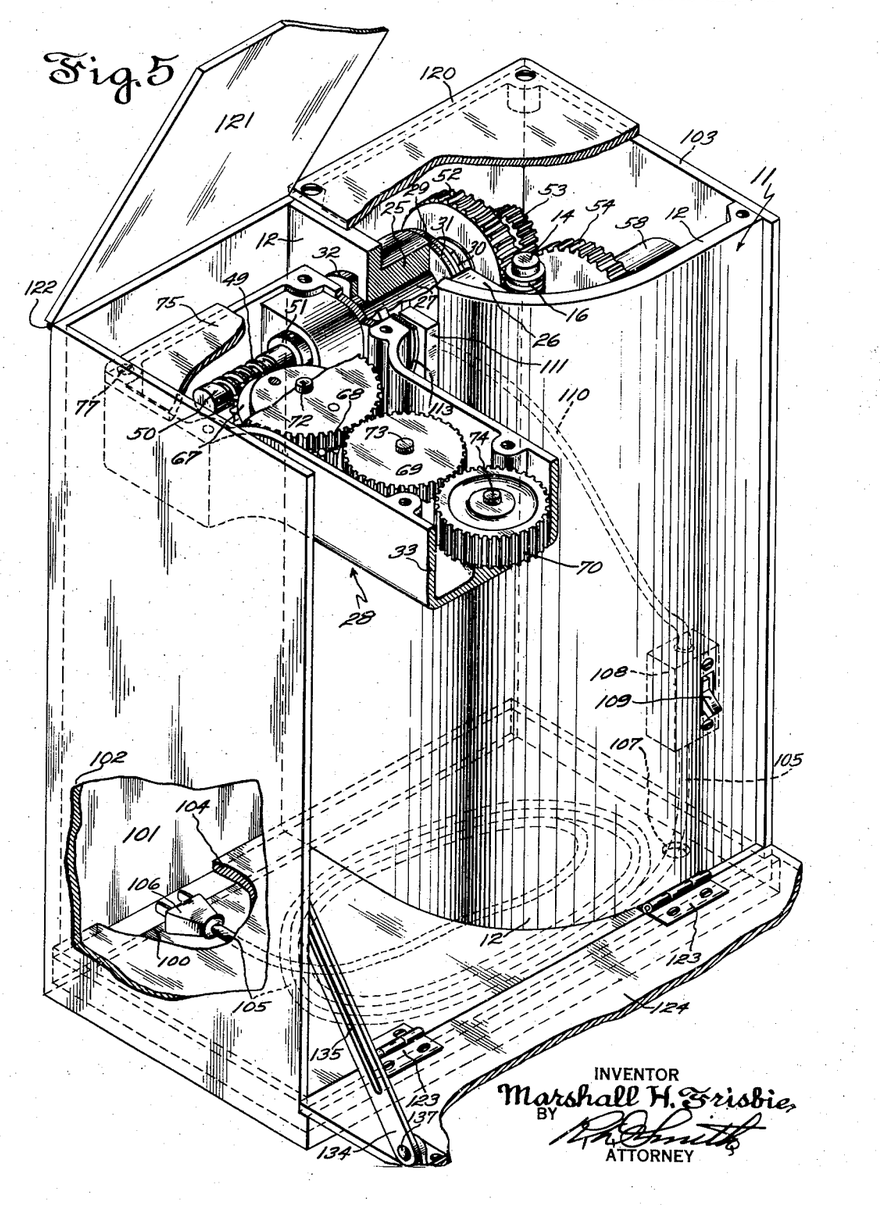
Fig. 5 is an enlarged isometric view of the improved mixer with cabinet sections and other parts broken away to expose interior construction and mechanism, the overarm being positioned as in Fig. 4.

A sturdy elongated bearing 25 is provided in the power plant frame 11 by a boss 26 cast integral with the curved frame wall 12. In Fig. 5 this bearing boss is shown as broken away to expose the continuity therethrough of a sturdy pivotal mounting trunnion 27 that is cast integral with a side wall of the rigid power transmission case or gear case comprising box casting 33 of overarm 28 and is journalled in wall 12 of the power plant. Trunnion 27 carries on its reduced threaded end portion a shoulder collar 29 fastened in place by nut 30 which has threaded engagement with the trunnion. Between collar 29 and the inner end of bearing 25 there is a thrust washer 31. Surrounding trunnion 27 between the anchored end of overarm 28 and the outer end of bearing 25 there is a similar thrust washer 32.

Figure 3:
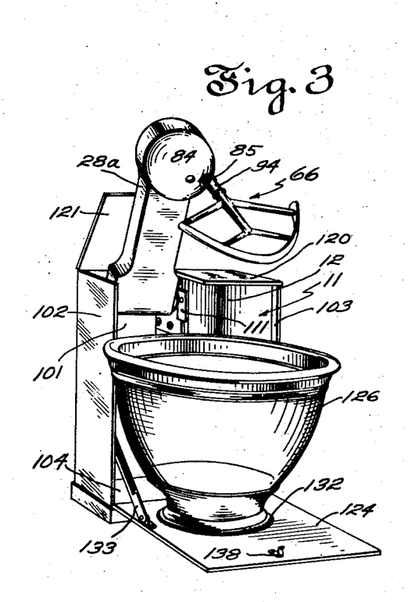
Fig. 3 is a perspective view of the mixer with the cabinet opened and a mixing bowl and beater tool in place.
Figure 4:
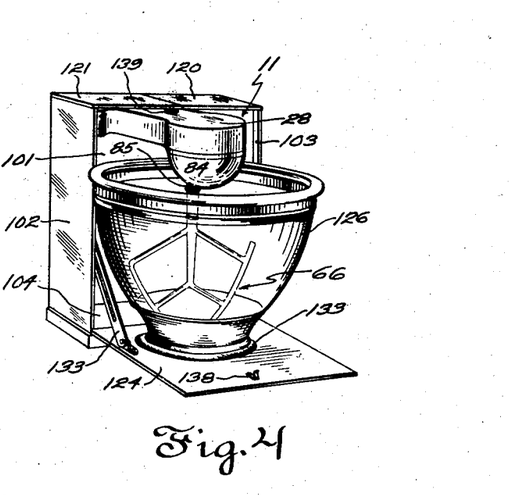
Fig. 4 shows the beater tool lowered to its working position within the bowl ready to agitate or mix food materials.

By the construction just described one end of the overarm 28 is swingably anchored and firmly yet pivotally supported in and solely by the power plant frame 11 at a relatively high point in the latter so that it is free to swing between its horizontal working position shown in Figs. 4, 5, 6, 7, 8 and 9, and angular positions above and below the horizontal such as an elevated position 28a shown in Figs. 3 and 9, and a downwardly extending or collapsed position shown in full lines in Fig. 9 and indicated by broken lines in Fig. 1 wherein the length of the overarm flanks the length of the standard. Collar 29 and nut 30 afford end thrust preventing axial withdrawal of trunnion 27 from the power plant frame. For the purpose of yieldably holding overarm 28 releasably in any of its said three positions catch means or detent means may be provided herein represented by three circumferentially spaced spot sockets 38, 39 and 40 each receptive in turn to the detent ball 41 which may be strongly urged radially toward trunnion 27 by a coiled spring 42. This spring occupies a hole that extends through an auxiliary boss 43 cast integral with power plant frame wall 12 adjoining bearing boss 26 which hole is threaded at its rear end to receive a headless screw backing up spring 42 to cause the latter to thrust with adjustable force upon detent ball 41. The pivotal joint provided by trunnion 27 is hollow and confined to a single side of overarm 28 so that the latter is completely offset in relation to frame wall 12.

Figure 10:
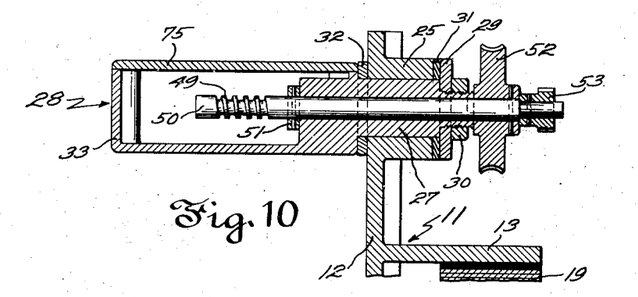
Fig. 10 is a fragmentary view taken in section on the plane 10—10 in Fig. 7, looking in the direction of the arrows.
Figure 12:
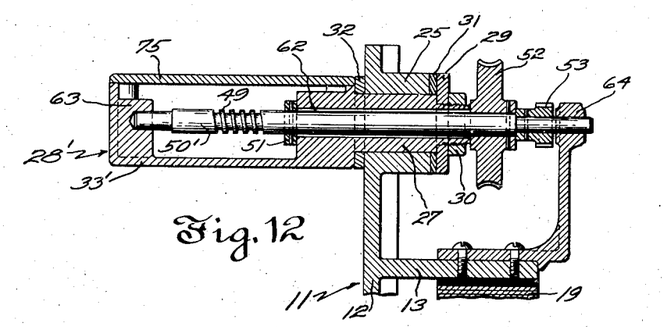
Fig. 12 is a sectional view taken on the same vertical plane as Fig. 10 showing a modified form of construction.

Trunnion 27 is hollow and in Fig. 10 is shown to contain an elongated hole affording rotary bearing for a continuous power transmitting or horizontal transmission shaft 50 which has a journal fit therein and extends completely through said hole. A modification at this point of the construction is shown in Fig. 12 which is hereinafter explained. Shaft 50 carries worm threads 49 on its end which occupies the box casting 33 of overarm 28 and also within the latter is provided with a thrust collar 51 pinned or otherwise fixed to shaft 50. On the opposite projecting end of shaft 50 there is pinned or otherwise fixed on the latter a worm wheel 52 and a spur pinion 53. Worm wheel 52, as most clearly shown in Figs. 5, 6 and 7, runs in mesh with the aforementioned worm 16 on motor shaft 14.

Pinion 53 runs in mesh with a spur gear 54 which is pinned or otherwise fixed to a stub shaft 55 having a slotted terminal head 56 for rotatively driving the moving element of auxiliary food working attachments such as food choppers, bean slicers, vegetable shredders, cheese graters, pea shellers, flour sifters, milk drippers, can openers, fruit juicers, etc. Shaft 55 with its slotted driving head 56 is journaled in a bearing hole 57 extending through the block-like projection 58 which may be cast integral with the power plant frame wall 12. Bayonet slots 59 are formed in the periphery of bearing hole 57 and open through the outer end thereof to receive and interlock with the supported projection 60 of the above mentioned auxiliary appliance to hold the latter firm and stationary while its operating instrumentality is being driven by the shaft head 56. I may refer to the entire structure of the bearing block 58 and its contents as the attachment power outlet and it may be constructed in all respects as more fully set forth in Figures 17, 18, 19 and 19a of the drawings of U. S. Patent No. 2,247,707 granted July 1, 1941.

Figure 7:
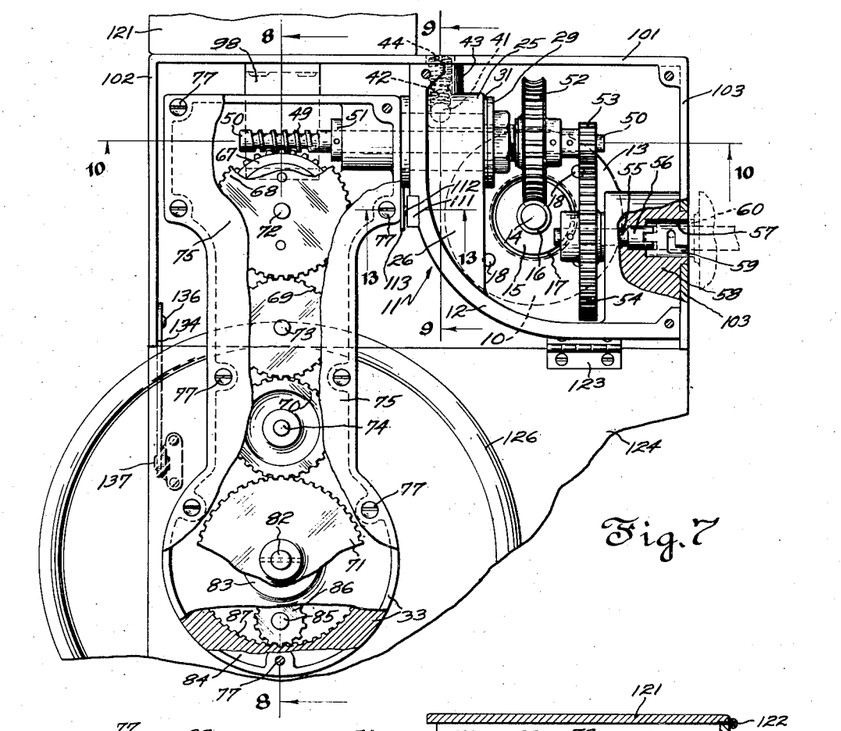
Fig. 7 is a plan view of the cabineted mixer with sections of the cabinet walls removed and other parts broken away to expose interior mechanism.
Figure 8:
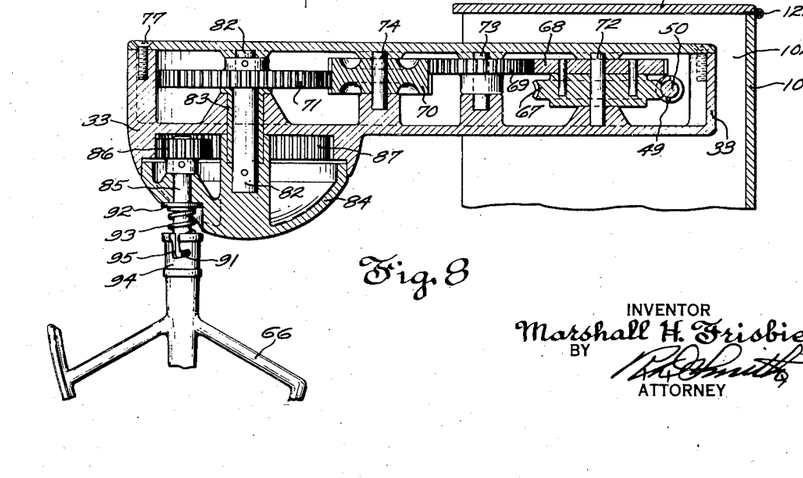
Fig. 8 is a view taken in section on the vertical plane 8—8 in Fig. 7, looking in the direction of the arrows.

Coming now to the power transmission mechanism affording operating connections between the beater tool 66 and the power worm 49, Figs. 5, 7 and 8 most clearly show a train of gears occupying overarm 28 which consist of the worm wheel 67, to which is fixed a spur gear 68, two idler pinions 69 and 70, and the beater head driven gear 71. The combined worm wheel 67 and spur gear 68 are free to turn in unison on spindle 72. Idler pinion 69 turns on spindle 73. Idler pinion 70 turns on spindle 74. These spindles 72, 73 and 74 are given a bearing at one end of each spindle in box casting 33 of overarm 28. The opposite or top ends of the spindles are given steadying bearings in the cover plate 75 of overarm 28. This cover plate may be fastened removably to the box casting 33 by screws 77.

The planet head driven gear 71 is pinned or otherwise fixed on the top end of a stub shaft 82 which is journaled in a bearing bushing 83 embedded in and projecting below the box casting 76. Shaft 82 itself projects below bearing bushing 83 and thereat fixedly carries the hollow bowl-shaped planet head 84. The top end of stub shaft 82 may be steadied in a bearing in the cover plate 75 as are spindles 73 and 74.

Journaled in an upright bearing hole in planet head 84 is the chuck shaft 85 carrying at its top end a planet pinion 86 pinned or otherwise fixed thereon and revolving, as well as rotating, in mesh with internal gear teeth 87 formed in the box casting 33 of the overarm. The bottom end of chuck shaft 85 projects downward outside of planet head 84 and thereat is equipped with a cross pin 91 between which and a thrust shoulder 92 fixed on shaft 85 there is placed under axial compression a coil spring 93. The bottom end of chuck shaft 85 is thereby in conventional manner equipped to serve as a tool holder and receive the mounting shank 94 of the agitator or beater tool 66 which contains a socket snugly fitting shaft 85 and provided with bayonet slots 95, so that when the beater tool is placed on the shaft, cross pins 91 can enter and interlock with bayonet slots 95 against the resistance of spring 93 which acts yieldingly to maintain the interlocked relationship. The tool can thereby be carried by its holder in a locus outside of certain cabinet structure next to be described and can be rotated about an axis extending in crosswise relation to the overarm 28 while at the same time parallel with the upright walls of the cabinet structure when the overarm is horizontal.

The combined power plant and overarm unit of Fig. 6 can be cabineted by casing structure of various types, that herein shown comprising a plain surfaced casing composed of a box-like body formed by a base wall 100, an upright rear wall 101 and upright side walls 102 and 103 all permanently joined together in rigid relationship. Walls 101 and 103 are fastened to frame wall 12 by screws 99. Rear wall 101 carries fixed thereon the bracket 98 which acts as a protective rest for overarm 28 in its collapsed position shown in Fig. 9.

Figure 2:
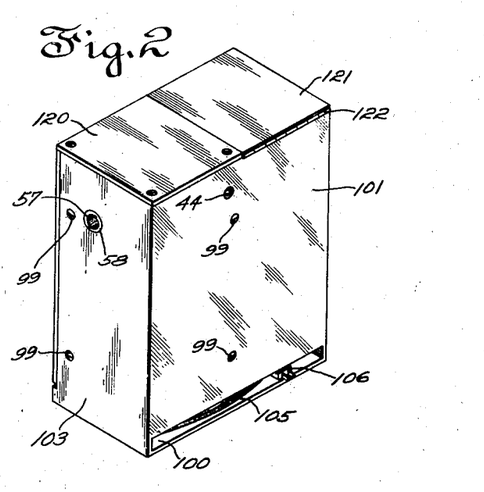
Fig. 2 is a similar view of the back of the appliance showing one side of the appliance provided with an accessory attachment outlet for power take-off.

Figs. 2 and 5 best show that the base of the cabinet is partitioned by a false bottom or floor wall 104 and that the rear wall 101 meets but does not extend below this false bottom so that between the base wall 100 and floor or partition wall 104 there is an accessible shallow space equal to the full base area of the cabinet for storing an electric attachment cord 105 and its terminal plug 106. The walls 100 and 104 are so close together that convolutions of the attachment cord are restricted to mainly a flat coil which inhibits tangling.

Figure 11:
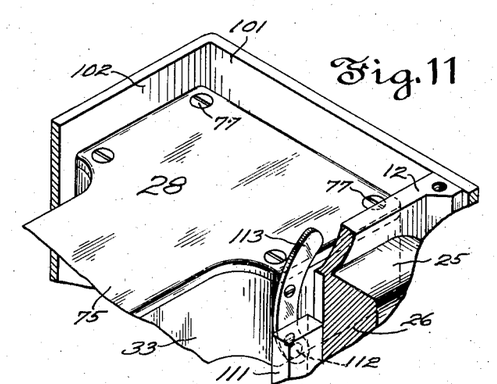
Fig. 11 is a fragmentary isometric view showing the pivotally mounted end of the overarm and its operative relationship to an electric circuit controller.
Figure 13:
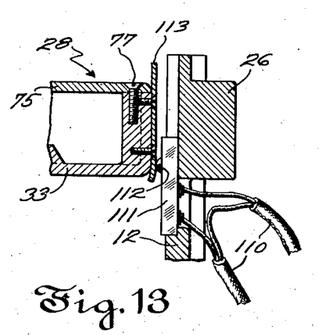
Fig. 13 is a fragmentary front view showing the overarm operated electric switch and parts sectioned on plane 13—13 in Fig. 7.

This attachment cord may lead upward through an aperture 107 in false bottom 104 to the interior of the power plant frame wall 12 whereat is mounted a manual flip switch 108 whose handle 109 projects forward through wall 12 to be accessible for manual operation to start and stop motor 10. Suitable electric connections 110 supply current from switch 108 to the motor 10. The electrical connections through 110 may be interrupted independently of switch 108 by a circuit controller shown as a micro switch 111 mounted on the outside of power plant frame wall 12 whose operating plunger 112 is mechanically associated with overarm 28 being positioned in the path of an arcuate switch operating device in the form of a cam plate 113 fixed on the exterior of box casting 33 of the swingable overarm 28 as best shown in Figs. 5, 11 and 13. Switch 111 is a self-contained unit including self-contained circuit switching electric contacts and may be constructed like that disclosed in U. S. Patent No. 1,960,020 characterized by the need of only an extremely small amount of mechanical movement, say a few thousands of an inch, in order to shift the switch contacts from On to Off position with a snap action.

The foregoing description of the cabinet box consisting of walls 100 to 104, inclusive, makes evident that this box provides doorways at its top and front and by means of screws 99 is joined with power plant frame wall 12 to complete the enclosure of a motor chamber containing the motor and reduction gearing. The top of this motor chamber is covered by a removable plate 120 giving access to the apparatus in the motor chamber while that section of the open top of the cabinet that is occupied by overarm 28 is covered by a top wall section that comprises a swingable lid 121 hinged at 122 to the rear cabinet wall 101. Lid 121 when closed lies over and in the path of upward swinging movement of overarm 28 but moves out of said path when lifted to open position. Other hinges 123 connect the bottom edge of a front door 124 of the cabinet with the base wall 100. Door 124 may thus be swung from its upright position shown in Figs. 1 and 9 wherein it closes a front cabinet opening or doorway flanked by the edges of upright walls 102, 103, to its open horizontal position shown in Figs. 3, 4 and 5. When in its horizontal position the door 127 may rest by means of its handle knob 125 on a table surface 127 and thereby serve as a platform spaced below overarm 28 on which to rest the mixing bowl 126 so that the latter will occupy the proper position to receive the rotating and gyrating power tool 66 in close proximity to the inner surface of the bowl. Door 127 may be provided with a circularly rimmed positioning mat 132 mounted on the inside face thereof for locating and retaining bowl 126 in proper position.

Figure 9:
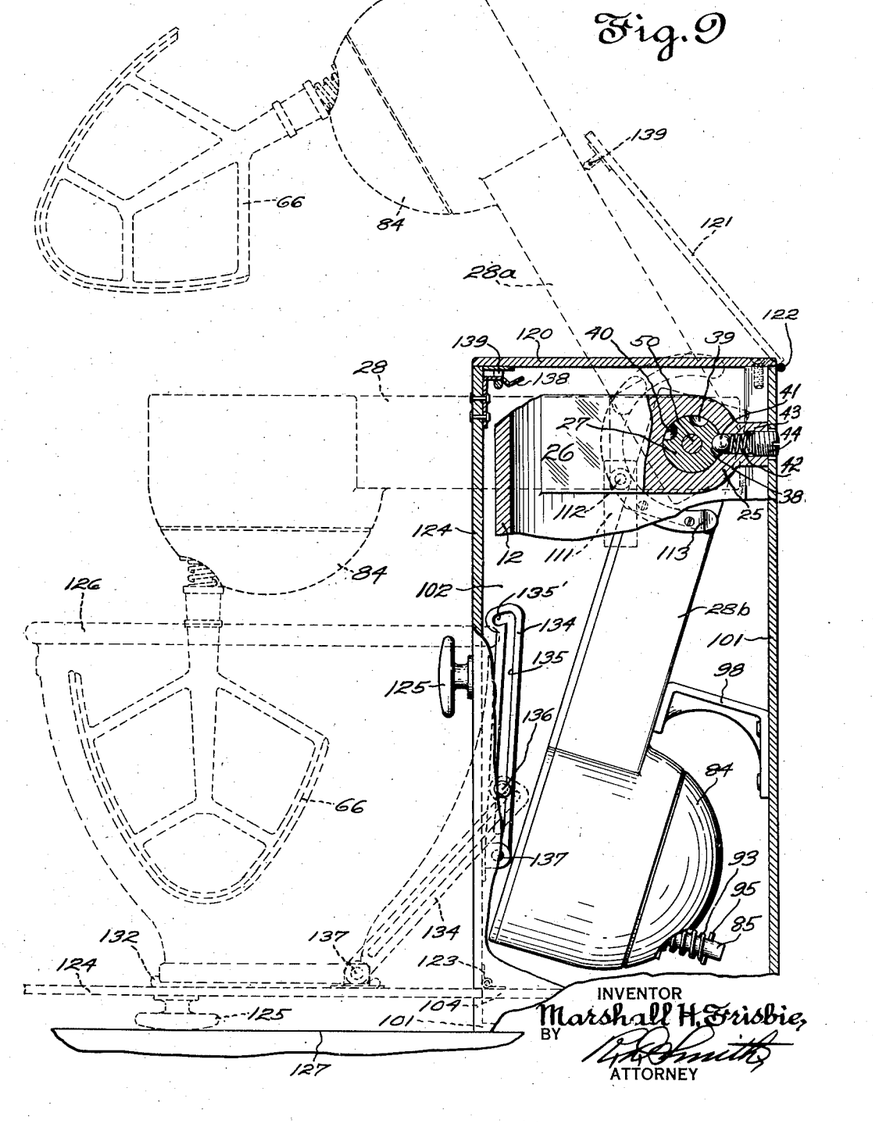
Fig. 9 is a view taken in section on the vertical plane 9—9 in Fig. 7, looking in the direction of the arrows.

To enable the opened door 124 to provide a stabilizing enlargement of the effective supporting base area of the appliance as a whole any suitable form of fastening means or stay as 133 capable of collapsing to a position within the cabinet as illustrated by full lines in Fig. 9 may be provided for bracing the cabinet in rigid relation to the door when the latter is fully lowered to horizontal position. A conventional stay such as 133 may consist of a single rigid link 134 pivoted at one end 137 to door 124 and provided with a lengthwise bayonet slot 135 sliding in engagement with a stud 136 fixed on cabinet wall 102 with which stud the terminal notch 135' of bayonet slot 135 slips into interlocking engagement to brace the door and cabinet firmly in right angle relationship. For holding the door 124 as well as lid 121 in their closed positions, a spring catch 138 on the door may spring into yieldably holding engagement with a striker loop 139 carried by the lid. The cabinet may be equipped with suitable carrying handles as desired.

In Fig. 12 a modified form of construction is shown wherein the transmission shaft 50' instead of having a bearing fit in the horizontal hole through trunnion 27 is provided with clearance 62 so that the shaft rotates free from contact with the trunnion and therefore can exert no friction tendency to cause the latter to turn in frame bearing 25. In this modified construction one end of shaft 50' is provided with a bearing 63 cast integral with the overarm structure 33 while the other end of this shaft is given bearing in a bracket 64 which may be bolted on or cast integral with the web 13 of the power plant frame 11.

The top of cover plate 75 of overarm 38 may carry a catch or hoop pivotally mounted thereon in position to be swung into such holding engagement with loop 139 as is catch 138 so that in the working or horizontal position of the overarm the latter will positively yet releasably be held from dropping downward toward the bowl in case the holding power of detent ball 41 should accidentally be overcome.

Figure 1:
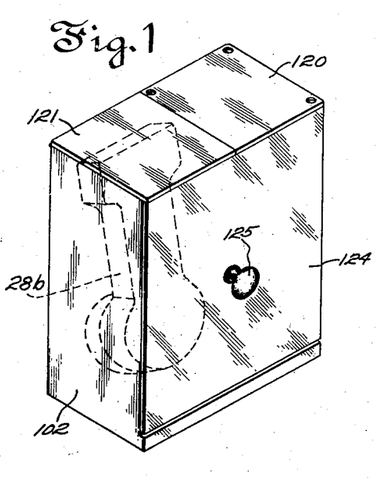
Fig. 1 is an isometric outside front view of a complete cabineted household food mixing appliance embodying the present improvements.

Between the times of using this improved cabinet culinary appliance for working foods it can conveniently be stored away in its cabinet-closed condition shown in Figs. 1 and 2. In this closed condition the appliance requires considerably less table area and height of storage space than does the conventional household food mixer that must be provided with a standard of sufficiently large permanent base area to support a heavy overhanging motor containing overarm of permanent cantilever nature. With or without the aid of suitable carrying handles, which it is not herein necessary to show but which may be provided at any suitable locations on the outside of the cabinet walls or doors, the entire appliance is easily transported from a storage spot, as a pantry shelf, to a place of use, as on a table suface in the kitchen.

If no use is to be made of the mixing or beating agitator tool 66 it will not even be necessary to open the cabinet to make use of the attachment power outlet 58 since an opening in door 124 may permit switch handle 109 to be reached from the outside when the cabinet is closed for starting and stopping motor 10. Also, if preferred, manual control switch 108 may be mounted on rear cabinet wall 101 so that its operating handle 109 is manually accessible from the outside of the rear of the cabinet by means of an opening in wall 101.

While motor 10 is running the power take-off shaft 55, 56 is being driven thereby at suitable speed to operate some auxiliary food processing attachment whose stationary body will have a rigid support shank 69 that can be plugged into outlet hole 57 and retainingly interlock with bayonet slots 59 for firm support while the food working movable element of the attachment is driven by the slotted head 56 of shaft 55. Such attachments may operate to crack ice pieces or perform many other well understood food preparing tasks including those hereinbefore mentioned. In this use of the appliance, electric circuit from switch 108 through switch 111 to the motor remains closed because the latter switch is maintained in On position by the pressure of cam 113 against switch operating plunger 112 in the collapsed or folded down position 28b of the overarm shown in Figs. 1 and 9.

For use of the mixing bowl 126 and food agitator, beater or mixing tool 66, the front door 124 is pulled forward by means of its handle knob 125 and is swung downward from its position in Figs. 1, 2 and 9 to its position in Figs. 3, 4, 5 and 7 (shown also in broken lines in Fig. 9).

The locking notch 135' of slot 135 in stay link 134 will fall into bracing engagement with the cabinet wall stud 136 so that the effective area of base support of the appliance on table top 127 is enlarged by the amount of that triangular area bordered by imaginary straight lines running from knob 125 to either of front corners of the cabinet base wall 100. This greatly increases the standing stability of the portable appliance and affords a platform on which mixing bowl 126 may be set. Before bowl 126 is put in place, overarm 28 will be swung forward and outward from the cabinet and then upward from its position 28b in Figs. 1 and 9 to its position 28a in Fig. 3 (also shown by broken lines in Fig. 9). The agitator or mixing tool 66 will then be placed on shaft 85 in well known manner and interlocked with the beater driving cross pins 91 of the latter. Bowl 126 can now be placed on the dropped door 124 and located thereon by mat 132 in assured coaxial relation to the working position of planet head 84. Thus when the overarm is swung from position 28a in Figs. 3 and 9 to its working position 28 in Figs. 4 and 9, the mixing tool will enter the bowl and any contents thereof to operate in such predetermined proximity to the walls of the bowl that the revolving of planet head 84 will cause the mixing tool to gyrate about the axis of shaft 83 in circular conformity to the inside of the bowl while it also rotates rapidly about the axis of shaft 85 for stirring or mixing food liquids, batter, etc. with accustomed efficiency.

When the stirring or beating operation is finished, the speed of the motor can be decreased by means of a variable transformer, rheostat or other well known form of motor speed control, not shown, which in well known manner will be connected in electrical series between the motor 10 and switch 111 or switch 108 and preferably located inside of the motor chamber in a manner to be manually operable from the outside thereof through a suitable opening in some cabinet wall. The overarm will then be elevated from its working position 28 to its elevated position 28a. In this upward swinging of the overarm the mixing tool will cease rotating just before it rises above the top of the bowl in order to prevent high speed of rotation from scattering the wet food ingredient with which the tool is coated. The particular point in the upward swing of overarm 28 at which the beater tool will cease to rotate is determined by the cam 113 which upon leaving contact with switch plunger 112 stops the motor from running until overarm is again lowered far enough toward its working position 28 to have entered the bowl.

The foregoing constructions and modes of operation are subject to other modifications than herein specifically mentioned within the spirit of this invention and many such modifications will be suggested to workers in this art by the disclosure herein. The appended claims are directed to and intended to cover all modifications and substitutes which fairly come within the language of the claims.

I claim:

1. In a collapsible household food mixing appliance the combination of, a support standard, an elongated rigid overarm, a driven rotor for detachably holding a food mixing tool and rotating the same at a free end of said overarm about an axis disposed crosswise the latter, a pivotal joint coupling the other end of said overarm to a high portion of said support standard, said joint being confined to a single side of said overarm that adjoins said standard thereby to offset said overarm completely in outboard relation to said high portion of the support standard for permitting unrestricted swinging movement of said overarm relative to said standard between a horizontal working position and an idle position extending upward and a collapsed position extending downward in which latter position the length of said overarm flanks the length of said standard.

2. In a household food mixer, the combination of a stationary power plant section, a motor in said power plant section, a swingable overarm section including a driven holder for a mixing tool, a hollow trunnion rigid with and projecting laterally from one side of said overarm section and journaled in said power plant section, means on said trunnion permitting the same freely to turn while preventing withdrawal thereof from said power plant section, and mechanism for transmitting power from said motor to said tool holder including a rigid shaft extending through said hollow trunnion from said power plant section to said overarm section.

3. In a household food mixer, the combination defined in claim 2, in which the said trunnion includes an elongated structure containing an elongated opening extending therethrough from the said overarm section to the said power plant section, said structure forming the sole support of said overarm section and said opening being occupied by the said shaft.

4. In a household food mixer, the combination defined in claim 2, in which the said power transmitting shaft is journaled in the said hollow trunnion and derives its bearing support solely therefrom.

5. In a household food mixer, the combination defined in claim 2, in which the said appliance sections include respectively adjacent housing walls, the said hollow trunnion being integral with one of said housing walls and journalled in the other of said housing walls.

6. In a household food mixer, the combination of a stationary power plant section, a motor in said power plant section, a swingable overarm section having a fixedly positioned vertical shaft including a driven holder for a mixing or like tool, a hollow joint pivotally supporting the overarm section on the power plant section for swinging movement relative to the latter, and mechanism for transmitting power from said motor to said tool holder including a continuous rigid power transmitting element extending horizontally through and free of engagement with said hollow joint and permanently associated mechanically with both said motor and said tool holder in all positions of said overarm section relative to said power plant section.

7. A collapsible cabineted household food mixer embodying in combination, a cabinet having a front opening and having a base wall on which the complete mixer may stably stand, a power plant including a motor fixed in said cabinet, an overarm swingably anchored to said power plant within said cabinet in a manner to be shiftable to angular positions both above and below a horizontal working position in which said overarm projects out of said cabinet through said opening, a tool holder on said overarm adapted in its said working position rotatably to carry a detachable mixer tool for mixing operation in a locus outside of said cabinet, and power transmitting mechanism mechanically connecting said motor and said tool holder in a manner to transmit movement from the former to the latter in all of said angular positions of said overarm.

8. A collapsible cabineted food mixer as defined in claim 7, together with detent means constructed and arranged to resist departure of said overarm in both directions from said working position and on occasion to release said overarm thereby to permit it to be swung either upward or downward to any of its said angular positions.

9. A collapsible cabineted food mixer as defined in claim 7, together with a circuit controller electrically connected to start and stop the said motor and mechanically associated with the said overarm in a manner to be actuated by swinging movement of the latter thereby to energize said motor when said overarm occupies substantially its said working position and to deenergize said motor when said overarm is swung to above said working position.

10. A cabineted household food mixer embodying in combination, a portable cabinet including a base surface and upright walls rising therefrom flanking a doorway, a power plant stationed within said cabinet including a motor, an elongated power transmission case, transmission mechanism within said case powered by said motor including a rotary chuck device diposed to hold and rotate a food mixing tool about an axis disposed crosswise said case, a pivotal joint anchoring one end of said elongated case at a relatively high point within said cabinet in a manner permitting said case to be swung from a downward extending collapsed position wholly within said cabinet to an outward extending working position reaching from said anchorage point past said doorway to the outside of said cabinet, in which working position the rotary axis of said mixing tool is substantially parallel with said upright wall of the cabinet, and catch means arranged cooperatively with said transmission case to maintain the latter releasably in said working position.

11. A cabineted foldable household food mixer as defined in claim 10, in which the said cabinet has a base wall and a movable front wall in hinged relation to said base wall comprising a door swingable to and from a position for closing the said doorway.

12. A cabineted foldable household food mixer as defined in claim 10, in which the said cabinet has a door disposed when in vertical position to close said doorway and mounted in hinged relation to the said base in a manner to swing downward to a horizontal position bordering the bottom of said doorway, thereby to afford a platform spaced sufficiently below said overarm when the latter occupies its said working position to support a container of mixable food material beneath said overarm.

13. A cabineted foldable household food mixer as defined in claim 10, in which the said cabinet has a door adapted to close the said doorway, and a sectional top wall, one section of which top wall lies over and in the path of upward swinging movement of the said overarm and is constructed and arranged to be movable out of said path to avoid interference with said overarm.

14. A cabineted foldable household food mixer as defined in claim 10, together with fastening means automatically operative to hold the said door and the said cabinet in rigid relation when said door occupies its said horizontal position, whereby said door enlarges the effective base area of said cabinet and thereby increases the standing stability of the food mixer.

15. A cabineted foldable household food mixer embodying in combination, a power plant, a portable cabinet having upright walls flanking a doorway, a door adapted to close said doorway, an overarm equipped to carry a food mixing tool, and a pivotal joint connecting said overarm to said power plant in a manner permitting said overarm to be swung from a collapsed position wholly within said cabinet to a working position projecting outward from said cabinet at a relatively high level through said doorway, the said cabinet further having a sectional top wall one section of which lies over and in the path of upward swinging movement of said overarm and is constructed and arranged to be movable out of said path to avoid interference with the overarm.

16. A collapsible cabineted household food mixer embodying a cabinet having upright walls flanking a doorway, and apparatus for rotating a food mixing tool within a food receptacle, said mixer including a power plant section of said apparatus fixed in said cabinet and a movable overarm section of said apparatus carrying a food mixing tool constructed and arranged to project outward from said cabinet through said doorway to a position placing said tool within the food receptacle when both said tool and receptacle are outside of said cabinet, said overarm section being swingably movable through said doorway in relation to said fixed power plant section into a storage position entirely within said cabinet.

MARSHALL H. FRISBIE.

REFERENCES CITED

The following references are of record in the file of this patent:

UNITED STATES PATENTS

| Number | Name | Date |
| --- | --- | --- |
| 1,604,242 | Smedberg | Oct. 26, 1926 |
| 1,618,650 | Gilchrist | Feb. 22, 1927 |
| 1,848,529 | Hoe | Mar. 8, 1932 |
| 1,913,157 | Greist et al. | June 6, 1933 |
| 1,975,949 | Jeppsson | Oct. 9, 1934 |
| 2,031,770 | Gilbert et al. | Feb. 25, 1936 |
| 2,086,658 | Ames | July 13, 1937 |
| 2,185,155 | Meeker et al. | Dec. 26, 1939 |
| 2,278,187 | Strauss et al. | Mar. 31, 1942 |

Certificate of Correction

Patent No. 2,462,089.

February 22, 1949.

MARSHALL H. FRISBIE

It is hereby certified that errors appear in the printed specification of the above numbered patent requiring correction as follows:

Column 4, line 22, after "transmitting" insert *element*; column 9, line 46, claim 6, strike out "having a fixedly positioned vertical shaft" and insert the same after "section" and before the comma in line 45, same claim;

and that the said Letters Patent should be read with these corrections therein that the same may conform to the record of the case in the Patent Office.

This certificate supersedes Certificate of Correction issued July 12, 1949.

Signed and sealed this 23rd day of August, A. D. 1949.

[SEAL]

THOMAS F. MURPHY,
*Assistant Commissioner of Patents.*